United States Patent
Genkin et al.

(10) Patent No.: US 9,657,371 B2
(45) Date of Patent: *May 23, 2017

(54) METHODS FOR EXTRACTING RARE-EARTH METALS AND PREPARING GYPSUM PLASTER FROM PHOSPHOGYPSUM HEMIHYDRATE

(71) Applicant: OPENED JOINT STOCK COMPANY "UNITED CHEMICAL COMPANY URALCHEM", Moscow (RU)

(72) Inventors: Mikhail Vladimirovich Genkin, Moscow (RU); Aleksey Vladimirovich Evtushenko, Moscow (RU); Aleksey Aleksandrovich Komkov, Moscow (RU); Alfiya Minerovna Safiulina, Moscow (RU); Vasiliy Sergeevich Spiridonov, Moscow (RU); Sergey Vladimirovich Shvetsov, Nizhegorodskaya oblast (RU)

(73) Assignee: OPENED JOINT-STOCK COMPANY "UNITED CHEMICAL COMPANY URALCHEM", Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 14/773,716

(22) PCT Filed: Nov. 8, 2013

(86) PCT No.: PCT/RU2013/000992
§ 371 (c)(1),
(2) Date: Sep. 8, 2015

(87) PCT Pub. No.: WO2014/137240
PCT Pub. Date: Sep. 12, 2014

(65) Prior Publication Data
US 2016/0047015 A1    Feb. 18, 2016

(30) Foreign Application Priority Data
Mar. 5, 2013 (RU) ................. 2013109740

(51) Int. Cl.
*C22B 59/00* (2006.01)
*C22B 3/06* (2006.01)
*C22B 3/10* (2006.01)

(52) U.S. Cl.
CPC ........... *C22B 59/00* (2013.01); *C22B 3/06* (2013.01); *C22B 3/065* (2013.01); *C22B 3/10* (2013.01); *Y02P 10/234* (2015.11)

(58) Field of Classification Search
None
See application file for complete search history.

(56) References Cited

U.S. PATENT DOCUMENTS

| | | | |
|---|---|---|---|
| 2,783,125 A | 2/1957 | De Rohden et al. |
| 4,169,880 A | 10/1979 | Cuer et al. |
| 5,030,424 A | 7/1991 | Fulford et al. |

FOREIGN PATENT DOCUMENTS

| | | | |
|---|---|---|---|
| CN | 101597688 A | * | 12/2009 |
| CN | 101823750 A | * | 9/2010 |
| EP | 0026132 A1 | | 4/1981 |
| EP | 0026132 B1 | | 8/1983 |
| EP | 0265547 A1 | | 5/1988 |
| EP | 0255534 A1 | | 1/1993 |
| EP | 0522234 A1 | | 1/1993 |
| KZ | 24267 A4 | | 7/2011 |
| PL | 155815 | | 6/1993 |
| RU | 2047562 C1 | | 11/1995 |
| RU | 2118613 C1 | | 9/1998 |
| RU | 2172719 C1 | | 8/2001 |
| RU | 2225892 C1 | | 3/2004 |
| RU | 2288171 C1 | | 11/2006 |
| RU | 2293781 C1 | | 2/2007 |
| RU | 2293134 C1 | | 10/2007 |
| RU | 2349652 C2 | | 3/2009 |
| RU | 2374260 C1 | | 11/2009 |
| RU | 2471011 C1 | | 12/2012 |
| RU | 2528573 C1 | | 9/2014 |

(Continued)

OTHER PUBLICATIONS

Koopman, Extraction of Lanthanides from the Phosphoric acid Production Process to gain a Purified Gypsum and a valuable Lanthanide by-product, Hydrometallurgy 58, 51-60 (Apr. 2000).*
International search report and written opinion of the international searching authority for co-pending PCT application No. PCT/RU2013/000992 mailed Apr. 10, 2014.
Decision to Grant a Patent for Invention mailed May 15, 2014 for RU Application No. 2013109740/02 filed Mar. 5, 2013, now RU Patent No. 2528576 C1.
International Search Report and Written Opinion of the International Searching Authority for co-pending PCT application No. PCT/RU2013/000988 mailed Mar. 13, 2014.
International Search Report and Written Opinion of the International Searching Authority for co-pending PCT application No. PCT/RU2013/000989 mailed Apr. 3, 2014.
International Search Report and Written Opinion of the International Searching Authority for co-pending PCT application No. PCT/RU2013/000991 mailed Apr. 10, 2014.

(Continued)

*Primary Examiner* — Melissa Swain
(74) *Attorney, Agent, or Firm* — Baker & Hostetler LLP

(57) ABSTRACT

The present invention relates to a method for complex processing of apatite concentrate resulting in producing concentrate of rare earth metals (REM) and plaster from phosphogypsum, a waste of sulphuric acid technology for producing phosphoric acid from apatite. The method comprises leaching of REM into solution by recrystallization of hemihydrate or anhydrite of calcium sulphate into dihydrate of calcium sulphate with a soluble calcium salt at concentrations of 0.075-3.75 M (in terms of $Ca^{2+}$) and strong acid (pKa0) at a concentration of 0.2-8.0 M (in terms of $H^+$). Recovery of REM into solution is up to 98%, the residual content of impurities of phosphorus, fluorine and alkali metals in dihydrate of calcium sulphate does not exceed 0.3 wt. %, 0.1 wt. %, 0.05 wt. %, respectively.

10 Claims, No Drawings

(56) References Cited

FOREIGN PATENT DOCUMENTS

| | | |
|---|---|---|
| RU | 2528576 C1 | 9/2014 |
| RU | 2538863 C2 | 1/2015 |
| RU | 2543160 C2 | 2/2015 |
| RU | 2546739 C2 | 4/2015 |
| SU | 862819 A1 | 9/1981 |
| SU | 950684 A1 | 8/1982 |
| SU | 1370076 A1 | 1/1988 |
| WO | 2006058508 A1 | 6/2006 |

OTHER PUBLICATIONS

International Search Report and Written Opinion of the International Searching Authority for co-pending PCT application No. PCT/RU2013/000990 mailed May 15, 2014.

\* cited by examiner

METHODS FOR EXTRACTING RARE-EARTH METALS AND PREPARING GYPSUM PLASTER FROM PHOSPHOGYPSUM HEMIHYDRATE

CROSS REFERENCE TO RELATED APPLICATIONS

This patent application is a national phase filing under section 371 of PCT/RU2013/000992, filed Nov. 8, 2013, which claims the priority of Russian patent application 2013109740, filed Mar. 5, 2013, each of which is incorporated herein by reference in its entirety.

FIELD OF THE INVENTION

The present invention relates to technologies for complex processing of apatite. In some embodiments, the present disclosure relates to technologies for obtaining a concentrate of rare-earth metals (REM) and gypsum plaster from phosphogypsum, a waste of sulphuric acid technology for producing phosphoric acid from apatite.

BACKGROUND OF THE INVENTION

Tens of millions of tons of phosphorus-containing minerals, such as apatite, rock phosphate, etc., are processed for producing phosphorus-containing fertilizers. Typically, the processing is carried out by treating these natural materials with concentrated nitric or sulphuric acid. During the treatment with sulphuric acid, apatite is decomposed with precipitation of calcium sulphate and formation of phosphoric acid solution. In this case, the main waste product is phosphogypsum (calcium sulphate contaminated with impurities of $P_2O_5$, F, Fe, Al, Sr, REM) which comprises most of the rare-earth metals contained in apatite. For example, apatite of the Kola Peninsula contains up to 1% of rare-earth metals, the 70 to 100% of which are precipitated with calcium sulphate at apatite processing with sulphuric acid. Phosphogypsum constitutes whole mountains around the plants for processing of apatite. Every year millions of tons of phosphogypsum containing about 0.5% REM in terms of oxides, which currently can not be extracted from it, are sent to dumps. Furthermore, the presence of such dumps containing toxic compounds including fluorine is an environmental problem. In this regard, numerous research projects have been conducted to develop processing technology to extract REM and remove toxic components.

A method for extracting rare-earth elements from phosphogypsum by treatment with nitric acid and subsequent extraction of rare earth elements (REE) by phosphine oxide is described in Martynova I. N. et al. Research of distribution of REE in the course of extraction from acidic nitrate-phosphate solutions. Collected articles "Processing and physico-chemical properties of compounds of rare elements. Apatity, 1984, pp. 6-8 (Rus). The disadvantage of this method is the need for expensive trialkyl phosphine oxide and the impossibility of complete liquid-phase removal of REE from the organic phase. Furthermore, because of the high loss of trialkyl phosphine oxide with the aqueous phase, this method is uneconomical and requires additional facilities for trialkyl phosphine oxide utilization.

Nitric acid extraction technology for isolation of rare earth elements from apatite, giving up to 85% release in a solution also containing phosphorus and fluorine is known (Kosynkin V. D. et al. "Condition and perspective of rare earth industry in Russia", "Metals" (rus), No. 1, 2001). The disadvantage of this method is the impossibility of using process solutions in a closed loop and the subsequent low recovery of REM in the process in closed loop.

Methods for extracting rare earth elements from phosphogypsum (PCT publication WO2011008137) may be used. The method involves the acid extraction of rare earth element compounds from phosphogypsum using a solution consisting of a mixture of sulphuric acid and nitric acid in a ratio of 3.2:1.2 with a concentration of 1-3 wt. % and a liquid to solid ratio of 4:5 over a period of 8-12 minutes, while the extraction suspension is agitated and subjected to a hydroacoustic effect. The insoluble gypsum residue is then separated from the extraction suspension and the rare earth element compounds are recovered from the extraction solution by cation exchange sorption with the extraction solution being passed through a cation exchange filter. Disadvantages of such methods may include: lack of a sufficiently high enough degree of extraction of rare earth metals (up to 85%); high cost of ion exchanger; long duration of the process; and large material flows.

A method for recovering rare-earth elements from phosphogypsum are disclosed in RU patent No. 2293781. The method involves treatment of phosphogypsum with sulphuric acid solution to recover rare-earth elements into solution, separation of gypsum precipitate, increasing of oversaturation rate of the solution in terms of rare-earth elements to crystallize rare-earth metal concentrate, and separation of the concentrate from mother liquor followed by concentrate processing. Phosphogypsum is treated with 22-30% sulphuric acid solution at liquids-to-solids ratio 1.8-2.2 during 20-30 min to prevent spontaneous crystallization of rare-earth element concentrate in solution before insoluble precipitate is separated. An increase of the oversaturation rate of the solution is achieved by means of providing sodium concentration 0.4-1.2 g/L. The disadvantage of this method is the use of additional reagents, high acid concentrations and significant amounts thereof, a large number of basic technological operations with incomplete extraction of rare earth elements (up to 71.4%) and the overall complexity of the process.

SUMMARY

Embodiments of the present disclosure provide for methods of extracting rare-earth metals (REM) from phosphogypsum. Methods of extracting rare-earth metals (REM) from phosphogypsum may comprise leaching REM into solution, wherein the leaching may be carried out by recrystallization of hemihydrate or anhydrite of calcium sulphate into dihydrate of calcium sulphate with a soluble calcium salt at concentration of 0.075 M to 3.75 M (in terms of $Ca_2^+$) and strong acid ($pK_a<0$) at concentration of 0.2 M to 8.0 M (in terms of $H^+$).

In some embodiments, the calcium nitrate or calcium chloride, or a mixture thereof may be used as the calcium salt, and nitric acid or hydrochloric acid or a mixture thereof may be used as the acid. In some embodiments, recrystallization may be carried out at 10° C. to 50° C. during 0.25 hours to 4.0 hours. In some embodiments, recrystallization may be carried out at 20° C. to 30° C. during 2.0 hours to 3.0 hours.

DETAILED DESCRIPTION

The present invention addresses the problem of highly efficient extraction of REM from phosphogypsum followed by obtaining REM concentrate, and simultaneous purification of calcium sulphate from phosphorus and fluorine impurities. In the present invention, the term "REM" is used to indicate lanthanides and yttrium. Also, the symbol "Ln" is used for these elements.

In some embodiments of the present disclosure, REM extraction into a solution (REM leaching) is carried out by recrystallization of phosphogypsum from hemihydrate $CaSO_4 \cdot 0.5H_2O$ or anhydride $CaSO_4$ into dihydrate $CaSO_4 \cdot 2H_2O$ in an acidic solution of calcium salts, wherein REM, fluorine impurities, phosphorus and alkali metals are extracted into the aqueous solution. Yield of REM extraction is 90-98%, the residual content of phosphorus, fluorine and alkali metal in calcium sulphate dihydrate is no more than 0.3 wt. %, 0.1 wt. %, 0.05 wt. %, respectively. Isolation of REM concentrate from the aqueous solution can be effected by any suitable method described in the literature.

The essence of the present invention is set forth in details below.

The authors of the present invention have found that a significant part of REM in the phosphogypsum hemihydrate is present in the form of compounds $MLn(SO_4)_2$ (wherein M—alkali metal atom, Na or K), forming a solid solution with the main phase of calcium sulphate. Thus, treatment of calcium sulphate which is not accompanied by changes in the crystal structure thereof will not provide a high degree of extraction of rare earth metals in the solution. That is, the best extraction of rare-earth metals is achieved by recrystallization of calcium sulphate hemihydrate $CaSO_4 \cdot 0.5H_2O$ or anhydride $CaSO_4$ into dihydrate $CaSO_4 \cdot 2H_2O$.

It is shown for dihydrate $CaSO_4 \cdot 2H_2O$ that REM form separate phases in the form of sulphates, while REM are not present in detectable amounts in crystals of $CaSO_4 \cdot 2H_2O$ available (Bushuev N. N., Nabiev A. G., Petropavlovskiy I. A., Smirnov I. C. "The nature of inclusion of REE cerium subgroup in the structure of calcium sulphate crystalline hydrates", Journal of Applied Chemistry (rus), 1988, No. 10, V. 61, pp. 2153-2158; Bobik V. M. Coprecipitation of rare earth elements in a system of three heterovalent ions with sulphates of alkali and alkaline earth elements. Radiochemistry (rus), 1977, No. 5, pp. 606-610).

Thus, REM extraction in the course of recrystallization of phosphogypsum hemihydrate can be described by the following equation:

$$MLn(SO_4)_2 \cdot n(2CaSO_4 \cdot H_2O)_{solid} \text{ solution} + 2Ca^{2+}_{solution} + (3n+4)H_2O \Leftrightarrow \Leftrightarrow (2n+2)Ca(SO_4) \cdot 2H_2O_{crystal} + M^+_{solution} + Ln^{3+}_{solution}.$$

This equation shows that the presence of calcium salts in the solution increases the yield of rare-earth metals into solution. Therefore, recrystallization is preferably carried out in the presence of readily soluble calcium salts: Ca$(NO_3)_2$, $CaX_2$ (where X is Cl, Br, I), $Ca(ClO_4)_2$, $CaSiF_6$ etc. The concentration of calcium salt is selected to allow: a) proceeding recrystallization of phosphogypsum (increasing calcium concentration makes dihydrate formation thermodynamically less favorable); and b) full recovering of the rare earth metals (as it is shown in the Examples below, increasing calcium concentration increases recovery rate). Use of $CaCl_2$ and $Ca(NO_3)_2$ at concentration of 10-300 g/L and 10-500 g/L, respectively, is especially preferred (0.075-3.75 M in terms of $Ca^{2+}$). The upper limit is determined by item "a" (the possibility of occurrence of recrystallization of hemihydrate), the bottom limit is determined by item "b" (the desired degree of rare earth metals extraction).

Due to the presence of various impurities in phosphogypsum, precipitation of REM can occurs as separate phases, such as $MLn(SO_4)_2$, $LnPO_4 \cdot nH_2O$, $LnF_3 \cdot nH_2O$, $M_xLn_y$ $(PO_4) \cdot nH_2O$ etc. Thus, recrystallization is preferably effected in the presence of a strong acid (pKa<0) forming soluble calcium salts. HX (where X is Cl, Br, I), $HNO_3$, etc. can be used. The acid dissolves all of the above-mentioned compounds of REM, as well as calcium phosphates and fluorides.

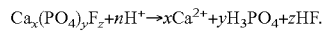

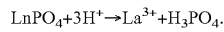

The concentration of acid is selected to allow: a) proceeding recrystallization of phosphogypsum (increasing acid concentration makes dihydrate formation thermodynamically less favorable); b) full recovering of the rare earth metals (as it is shown in the Examples below, increasing acid concentration increases recovery rate); c) most complete dissolution of phosphorus, fluorine, alkali metal impurities contained in the phosphogypsum. g) The concentration of acid in the solution should prevent REM precipitation in form of phosphates, fluorides, double sulphates. Use of HCl and $HNO_3$ at concentration of 5-250 g/L and 5-300 g/L, respectively, is especially preferred (0.2-8 M in terms of $H^+$). The upper limit is determined by item "a" (the possibility of occurrence of recrystallization of hemihydrate), the bottom limit is determined by items "b"-"g" (the desired degree of rare earth metals extraction, degree of calcium sulphate purity).

The duration and temperature of the process is determined by the same demands, —the possibility of occurrence of recrystallization of hemihydrate into dihydrate and the completeness of recrystallization. The process is preferably carried out at 10-45° C. for 0.5-4 hours, most preferably—at 20-30° C. for 1-2 hours.

Conversion of hemihydrate into dihydrate and anhydride into dihydrate is thermodynamically possible, but due to the high stability of the calcium sulphate anhydride, conversion of anhydride into dihydrate takes too much time (under normal conditions the detectable conversion occurs within a few weeks). Conversion of hemihydrate into dihydrate is more preferable, since it occurs quickly.

If all the above conditions are fulfilled, the degree of extraction of rare earth metals in the solution is up to 98%, a residual content of phosphorus, fluorine and alkali metal impurities in calcium sulphate dihydrate does not exceed 0.3 wt. %, 0.1 wt. %, and 0.05 wt. %, respectively.

Isolation of REM concentrate from an aqueous solution is described in the literature (e.g. Chemistry and technology of rare and trace elements. Part 2. Ed. Bolshakov K. A., Moscow, High School, 1976, p. 360 (rus)) and is not the subject of the present invention. As an example, a process comprising liquid extraction of REM into an organic extractant, REM re-extraction from the organic phase with concentrated acid, neutralizing the acid by carbonates, alkali metals or ammonia, and precipitating REM in the form of carbonate, hydroxide, etc. is well-known. For the extraction from nitrate solutions, organic extractants based on neutral organophosphorous compounds (preferably tributylphospate—TBP) are typically used. For the extraction from chloride solutions, extractants based on organophosphorous acids (preferably di-(2-ethylhexyl)phosphoric acid—DEHPA) are typically used. By choosing suitable process conditions (nature of the extraction system, the ratio of the organic extractant/aqueous solution, amount of extraction and re-extraction stages, REM precipitation mode), up to 98% REM contained in the solution after recrystallization of phosphogypsum can be extracted into concentrate.

Thus, the overall recovery of REM from phosphogypsum into the concentrate according to the invention is up to 95%.

The present invention is explained in more detail below using exemplary embodiments, serving solely for illustrative purposes and not intended to limit the scope of the present invention defined by the appended claims.

Examples 1-7

Recrystallization of $CaSO_4*2H_2O$ in solutions x % $HNO_3$+y % $Ca(NO_3)_2$ was carried out under the following conditions: temperature—20-45° C., total time of crystallization—3 hours, the weight ratio of the solution (L, liquid) and loaded hemihydrate (S, solid), L/S=1/1 to 3/1. Recrystallization was carried out by continuously stirring the suspension.

At the end of the recrystallization process, precipitate of dihydrate of calcium sulphate was filtered at a press-filter. Resulted dihydrate was washed on the filter with water in a five-stage counter-current mode. The amount of wash water was 70% by weight of the loaded phosphogypsum.

Table 1 shows the composition of the initial hemihydrate and the resulting recrystallized dihydrate. Concentrations of impurities are shown relative to anhydrous $CaSO_4$.

Example 8

Recrystallization of $CaSO_4*2H_2O$ was carried out in solution 7% HCl+17% $CaCl_2$ under the following conditions: temperature—22-25° C., total time of crystallization—3 hours, the weight ratio of the solution (L, liquid) and loaded hemihydrate (S, solid), L/S=3/1. Recrystallization was carried out at continuously stirring the suspension.

At the end of the recrystallization process, precipitate of dihydrate of calcium sulphate was filtered using a vacuum filter. Resulted dihydrate was washed on the filter with acetone followed by drying at 50-70° C. The amount of acetone was 200% by weight of the loaded phosphogypsum.

Table 2 shows the composition of the initial hemihydrate and the resulting recrystallized dihydrate. Concentrations of impurities are shown relative to anhydrous $CaSO_4$.

Example 9

Control

Recrystallization of $CaSO_4*2H_2O$ was carried out in solution 20% $HNO_3$+30% $Ca(NO_3)_2$ under the following conditions: temperature—20-25° C., total time of crystallization—3 hours, the weight ratio of the solution (L, liquid) and loaded hemihydrate (S, solid), L/S=3/1. Recrystallization was carried out by continuously stirring the suspension.

After the end of the recrystallization process, precipitate of dihydrate of calcium sulphate was filtered using a vacuum filter. Resulted dihydrate was washed on the filter with acetone followed by drying at 50-70° C. The amount of acetone was 200% by weight of the loaded phosphogypsum.

Table 3 shows the composition of the initial hemihydrate and the resulting recrystallized precipitate. Concentrations of impurities are shown relative to anhydrous $CaSO_4$.

As can be seen from the data in Tables 1-3, if recrystallization of hemihydrate into dihydrate was not fully completed, extraction of impurities into the solution is greatly reduced and, accordingly, the level of impurities in the residual insoluble precipitate is increased.

While the present invention is described in detail above, one skilled in the art will recognize that modifications and equivalent substitutions can be made, and such modifications and substitutions are within the scope of the present invention defined by the appended claims.

TABLE 1

| Example No. | Temperature, ° C. | L/S | Time, hours | $HNO_3$ concentration, wt. % (M) | $Ca(NO_3)_2$ concentration, wt. % (M) | Solid phase | $H_2O$ total, wt. % | $H_2O$ cryst., wt. % | $P_2O_5$, wt. % | F, wt. % | $Ln_2O_3$, total, wt. % | $Na_2O$, wt. % | $K_2O$, wt. % |
|---|---|---|---|---|---|---|---|---|---|---|---|---|---|
| 1 | 20-22 | 3/1 | 3 | 4% (0.83 M) | 30% (2.4 M) | Source phosphogypsum | 23.9 | 6.9 | 0.71 | 0.22 | 0.480 | 0.197 | 0.056 |
|   |   |   |   |   |   | Resulting dihydrate | 29.30 | 20.7 | 0.03 | 0.01 | 0.015 | 0.029 | n.d. |
| 2 | 20-22 | 1/1 | 3 | 12% (2.51 M) | 25% (2.0 M) | Source phosphogypsum | 30.0 | 6.8 | 1.06 | 0.31 | 0.46 | 0.14 | 0.066 |
|   |   |   |   |   |   | Resulting dihydrate | 31.6 | 20.7 | 0.26 | 0.050 | 0.082 | 0.050 | 0.024 |
| 3 | 20-22 | 3/1 | 3 | 12% (2.51 M) | 25% (2.0 M) | Source phosphogypsum | 19.3 | 7.1 | 1.38 | 0.27 | 0.62 | 0.12 | 0.07 |
|   |   |   |   |   |   | Resulting dihydrate | 33.9 | 20.8 | 0.08 | 0.037 | 0.025 | 0.024 | 0.011 |
| 4 | 40-42 | 3/1 | 0.25 | 12% (2.51 M) | 25% (2.0 M) | Source phosphogypsum | 31.6 | 6.9 | 0.86 | 0.28 | 0.51 | 0.10 | 0.06 |
|   |   |   |   |   |   | Resulting dihydrate | 29.6 | 19.5 | 0.093 | 0.042 | 0.055 | 0.023 | 0.02 |
| 5 | 40-42 | 3/1 | 3 | 12% (2.51 M) | 25% (2.0 M) | Source phosphogypsum | 31.6 | 6.9 | 0.86 | 0.28 | 0.51 | 0.10 | 0.06 |
|   |   |   |   |   |   | Resulting dihydrate | 28.9 | 20.6 | 0.072 | 0.034 | 0.046 | 0.018 | 0.03 |
| 6 | 20-22 | 3/1 | 2 | 1.5% (0.33 M) | 40% (3.4 M) | Source phosphogypsum | 27.1 | 7.2 | 1.58 | 0.36 | 0.45 | 0.14 | 0.10 |
|   |   |   |   |   |   | Resulting dihydrate | 33.4 | 19.1 | 0.56 | 0.12 | 0.11 | 0.08 | 0.06 |
| 7 | 20-22 | 3/1 | 2 | 19% (3.9 M) | 10% (0.8 M) | Source phosphogypsum | 28.6 | 7.1 | 0.99 | 0.25 | 0.42 | 0.11 | 0.05 |
|   |   |   |   |   |   | Resulting dihydrate | 29.9 | 20.4 | 0.91 | 0.028 | 0.061 | 0.04 | 0.03 |

TABLE 2

| Solid phase | H₂O total, wt. % | H₂O crystal, wt. % | P₂O₅, wt. % | F, wt. % | Ln₂O₃ total, wt. % |
|---|---|---|---|---|---|
| Source phosphogypsum | 28.5 | 7.3 | 1.28 | 0.42 | 0.77 |
| Resulting dihydrate | 29.3 | 20.7 | 0.13 | 0.075 | 0.108 |

TABLE 3

| Solid phase | H₂O total, wt. % | H₂O cryst., wt. % | P₂O₅, wt. % | F, wt. % | Ln₂O₃ total, wt. % | Na₂O, wt. % | K₂O, wt. % |
|---|---|---|---|---|---|---|---|
| Source phosphogypsum | 31.1 | 7.5 | 2.34 | 0.36 | 0.584 | 0.289 | 0.097 |
| Resulting dihydrate | 13.1 | 12.9 | 0.477 | 0.07 | 0.394 | 0.112 | 0.047 |

What is claimed:

1. A method for extracting rare-earth metals from phosphogypsum into solution comprising:
   (a) treating a hemihydrate or anhydrite of calcium sulphate with a mixture of a strong acid and a soluble calcium salt to form a calcium sulphate mixture; and;
   (b) precipitating calcium sulphate dihydrate from the calcium sulphate mixture to form a calcium sulphate dihydrate precipitate and a rare-earth metal enriched supernatant,
   wherein the strong acid has a pKa of less than 0,
   wherein the strong acid has an H+ concentration from 0.2 M to 8.0 M, and
   wherein the soluble calcium salt has a $Ca^{2+}$ concentration from 0.075 M to 3.5 M.

2. The method of claim 1, wherein the soluble calcium salt is selected from the group consisting of calcium nitrate, calcium chloride, and a mixture thereof.

3. The method of claim 1, wherein the treating the hemihydrate or anhydrite of calcium sulphate with the mixture of the strong acid and the soluble calcium salt is carried out at 10° C. to 50° C. during 0.25 hour to 4.0 hours.

4. The method of claim 1, wherein the treating the hemihydrate or anhydrite of calcium sulphate with the mixture of the strong acid and the soluble calcium salt is carried out at 20° C. to 30° C. during 2.0 hours to 3.0 hours.

5. The method of claim 1, wherein the strong acid is selected from the group consisting of nitric acid, hydrochloric acid, and a mixture thereof.

6. The method of claim 1, further comprising filtering the calcium sulphate dihydrate precipitate from the rare earth metal supernatant.

7. The method of claim 6, further comprising concentrating the rare earth metal enriched supernatant to form a rare earth metal concentrate.

8. The method of claim 1, wherein the rare-earth metal enriched supernatant comprises lanthanum.

9. The method of claim 1, wherein the rare-earth metal enriched supernatant comprises yttrium.

10. The method of claim 1, wherein the rare-earth metal enriched supernatant comprises a combination of lanthanum and yttrium.

* * * * *